United States Patent
Zhang et al.

(10) Patent No.: US 10,136,482 B1
(45) Date of Patent: Nov. 20, 2018

(54) LIGHTING DRIVER, LIGHTING SYSTEM AND CONTROL METHOD

(71) Applicant: PHILIPS LIGHTING HOLDING B.V., Eindhoven (NL)

(72) Inventors: Xianhui Zhang, Eindhoven (NL); Derek Zheng, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/892,505

(22) Filed: Feb. 9, 2018

(30) Foreign Application Priority Data

Jan. 23, 2018 (WO) ............... PCT/CN2018/073862

(51) Int. Cl.
  *H05B 33/08* (2006.01)
(52) U.S. Cl.
  CPC ..... *H05B 33/0815* (2013.01); *H05B 33/0845* (2013.01); *H05B 33/0887* (2013.01)
(58) Field of Classification Search
  CPC ............ H05B 33/0815; H05B 33/0818; H05B 33/0845; H05B 33/0809; H05B 33/0848; H05B 33/0803; H05B 37/0272
  USPC ................... 315/291, 294, 119, 224
  See application file for complete search history.

(56) References Cited

U.S. PATENT DOCUMENTS

| | | | | |
|---|---|---|---|---|
| 5,650,694 A | * | 7/1997 | Jayaraman | H05B 41/2828 307/157 |
| 2005/0035729 A1 | * | 2/2005 | Lev | H05B 37/0263 315/291 |
| 2012/0104964 A1 | * | 5/2012 | Hughes | H05B 33/0815 315/291 |
| 2014/0062320 A1 | | 3/2014 | Urano | |
| 2014/0312796 A1 | * | 10/2014 | Sauerlander | H05B 33/0815 315/210 |
| 2014/0320007 A1 | * | 10/2014 | Stamm | H05B 33/0815 315/51 |
| 2015/0312989 A1 | * | 10/2015 | Wee | H05B 33/0854 315/113 |
| 2016/0011991 A1 | | 1/2016 | Allen et al. | |
| 2016/0227622 A1 | | 8/2016 | Ackermann et al. | |
| 2017/0279300 A1 | * | 9/2017 | Catalano | H02J 7/0068 |
| 2017/0303353 A1 | * | 10/2017 | Guang | F21V 23/00 |
| 2017/0311396 A1 | * | 10/2017 | Sadwick | F21V 25/00 |

* cited by examiner

*Primary Examiner* — Douglas W Owens
*Assistant Examiner* — Syed M Kaiser

(57) ABSTRACT

A lighting driver is for receiving an alternating current power supply from a fluorescent lighting ballast and makes use of a closed loop control of a shunt device for selectively shunting the power supply for example to implement dimming control. The closed loop control is adapted based a detected current. This enables low frequency components of the ballast current to be removed or reduced so that a smaller output capacitor is needed.

15 Claims, 7 Drawing Sheets

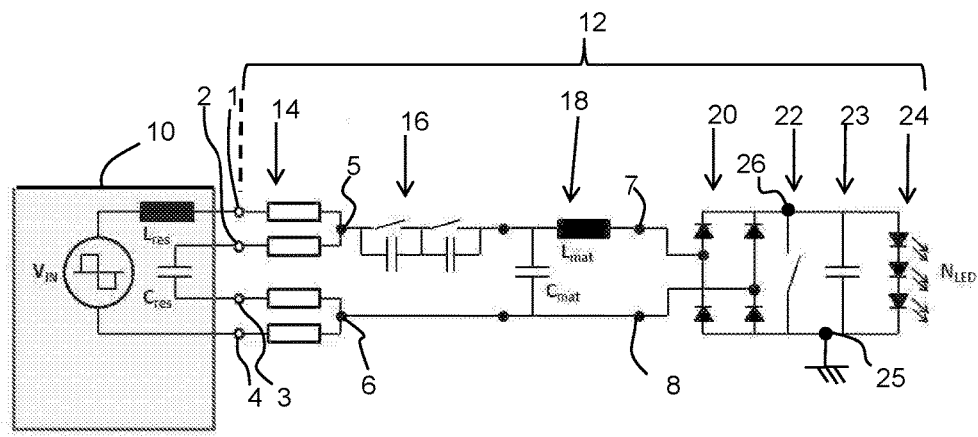
FIG. 1
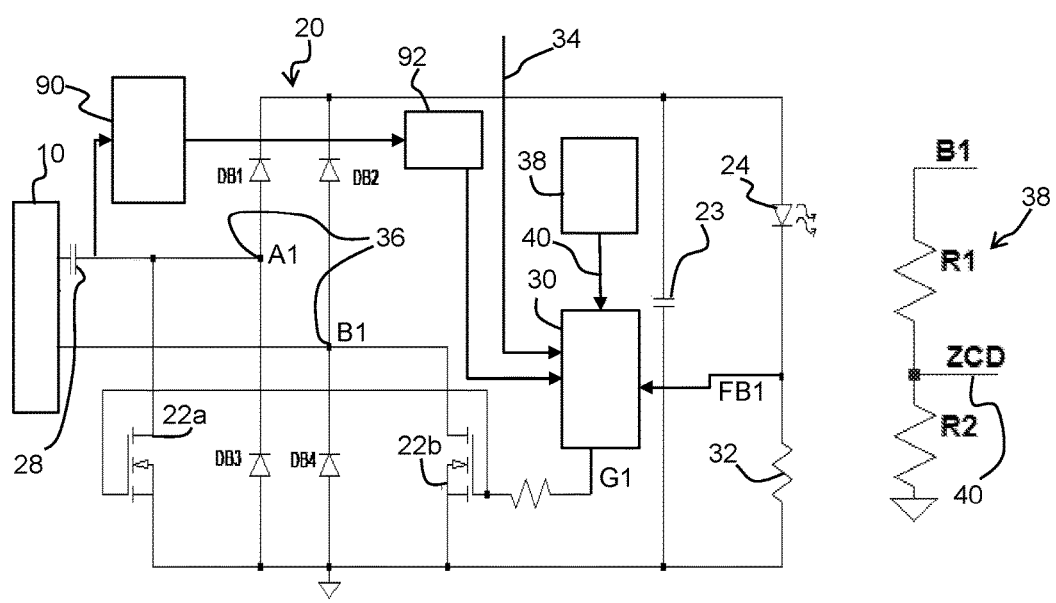
FIG. 2
FIG. 3

LIGHTING DRIVER, LIGHTING SYSTEM AND CONTROL METHOD

FIELD OF THE INVENTION

This invention relates to a solid state lighting driver, which is for connection to a fluorescent ballast. The invention further relates to a lighting system and to a method.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaries equipped with electronic ballasts for fluorescent tube lamps.

There are now tubular LED ("TLED") lamps which can be used as a direct replacement for traditional fluorescent light tubes. In this way, the advantages of solid state lighting can be obtained without the expense of changing existing light fittings. Indeed, TLEDs that are compatible with fluorescent lamp ballasts are the most straightforward and lowest cost way of replacing fluorescent lighting by LED lighting. Both rewiring (removing the ballast, connecting a TLED directly to AC mains) and replacing the whole luminaire are considerably more cumbersome and expensive. It may be advantageous to provide a TLED that is compatible with the existing luminaire and the ballast therein. Both electromagnetic (EM) and electronic high frequency (HF) ballasts are used in fluorescent lighting.

FIG. 1 shows a typical block diagram of a TLED that is compatible with a fluorescent ballast.

The ballast 10 comprises a half-bridge parallel resonant converter and it drives an electronic (high frequency) ballast compatible TLED 12.

The ballast 10 and high frequency compatible TLED 12 are connected via the connection pins 1 and 2 at one end of the TLED and via the connection pins 3 and 4 at the other end of the TLED.

A high frequency compatible TLED 12 typically comprises all of the building blocks depicted in FIG. 1. These are a filament emulation unit 14, a pin safety and start-up circuit 16, a matching circuit 18, a rectifier 20, an LED driver 22, a smoothing capacitor 23 and the LED string 24. The LED string 24 extends between an internal ground 25 and a high voltage DC bus 26.

For most of these building blocks, the implementations shown in FIG. 1 are just examples and other implementations of their functions are possible and are also used.

The details of the design of the half-bridge ballast 10 are not shown in FIG. 1. This type of ballast is also just an example and other implementations such as push-pull converters are also possible and in use.

The LED driver shown in FIG. 1 is a shunt switch driver. In this type of driver, a shunt switch 22 performs a shorting function in order to implement dimming control.

In the shunt driver design, the shunt switch is controlled by a controller integrated circuit (not shown) in order to provide a duty cycle which provides a desired light output. In a widely used implementation, the shunt switch is controlled per period of the time-varying input signal. This shunt control signal needs to be timed with the frequency of the time-varying input signal e.g. the high frequency signal from an electronic ballast and for this purpose a detection signal is used for timing control. This mains detection signal for example is based on detection of the current flowing from the ballast. A convenient detection signal is the zero crossing of the time-varying input signal which is an AC signal.

A key challenge of new LED drivers is to reduce the size of driver, particularly as more and more functions are added to the driver, such as the Internet of Things and sensor integration. A reduction in the size of the driver is needed in order to provide space for function blocks for these additional functions.

A problem with existing driver designs is the need for a big capacitor to filter the low frequency ripple current for LED lighting.

For some ballasts such as electronic ballasts in North America, the ballast output is not a AC signal with a fixed peak amplitude but with varying peak amplitude. A normal peak amplitude AC signal is for normal burning of the fluorescent lamp; and a periodic higher peak amplitude AC signal is for igniting the fluorescent lamp. The varying frequency is much higher than a control loop for determining the duty cycle of the shunt switch. In other words, the shunt switch has a fixed duty cycle during the varying peak amplitude thus the output after the shunt switching is also varying. This requires a large output capacitor to smooth the varying output. This problem is discussed further below with reference to FIG. 6.

SUMMARY OF THE INVENTION

The invention is defined by the claims.

It is a concept of the invention to adapt the even lower frequency closed loop control of a shunt device of a shunt driver when the peak amplitude of the ballast output varies with a low frequency (with respective to the high frequency AC ballast output), so that low frequency components of the ballast current can be removed or reduced. These low frequency components for example result from periodic ignition signals of the ballast. The shunt device is responsive to the low frequency varying peak amplitude of the ballast output such that the output after the shunt switching is more smooth with reduced low frequency components. By reducing the low frequency components, a smaller output capacitor is needed.

According to examples in accordance with an aspect of the invention, there is provided a lighting driver, comprising:
a driver input for receiving an alternating current power supply from a lighting ballast;
a shunt device for selectively shunting the power supply;
a controller operating closed loop control for operating or not operating the shunt device, wherein the controller is adapted to operate the shunt device during a portion of the cycle of the alternating current power supply, such that a current is delivered to a lighting load only during the portion of the cycle of the alternating current power supply when the shunt device is not operated;
a detector for detecting the current received from the alternating current power supply with a frequency larger than the closed loop control frequency; and a feedforward control circuit for adapting the closed loop control of the controller based on the detected current.

This lighting driver makes use of closed loop shunt control to provide a duty cycle which provides a desired light output. This shunt control signal is timed with the alternating current power supply (e.g. derived from a mains signal). This is the original feedback control loop of shunt switching that usually copes with the burning AC ballast output with a fixed peak amplitude. The closed loop is intended to enable adjustments to brightness levels, e.g. dimming control, so that these may be implemented in a manner which is perceived by a user to be instantaneous. The response frequency of the closed loop control is for example of the order of tens of Hz, such as 20 Hz. This is not sufficiently rapid to detect and hence compensate for faster current variations like ignition current with 200 Hz frequency.

Based on detection of the current received, at a higher frequency than the closed loop control frequency, the shape of the current is detected with a resolution finer than the closed loop control period. By "detection at a higher frequency" is meant the current value is detected at multiple time points within the time period corresponding to the closed loop control period. The detection samples may be taken at a frequency as high as 50 kHz (i.e. every 20 µs), so that the current shape within the closed loop control period may accurately be monitored. More generally, the current detection may take place with a sampling frequency above 1 kHz and typically in a range 30 kHz to 100 kHz.

The feedforward control circuit is used to modify the closed loop control to take account of these faster current fluctuations of ignition current, such that a more constant current amplitude is delivered to the lighting load, with reduced signal frequency components caused by shaping of the current waveform. This is advantageous in that the size of a smoothing capacitor across the lighting load may be reduced, thereby reducing the size and cost of the driver. The invention involves duty cycle control at two levels, one is for lower speed brightness control and the other is for higher speed current shaping.

By reshaping the output current to be flat and without a low frequency ripple current, the high value output capacitor can be removed without any effect on light output. This current shaping may for example be to flatten current peaks resulting from a ballast ignition cycle, which for example repeats at a frequency of 200 Hz and hence faster than the response time of the closed loop control.

The ballast is preferably a ballast for a fluorescent lamp or a HID (high intensity discharge) lamp.

The alternating current power supply for example has a first AC duration comprising signal alternations with a first peak amplitude and a second AC duration comprising alternations with a second peak amplitude, wherein said first AC duration and said second AC duration appear alternatively, and said detector is for detecting the occurrence of the second AC duration and said feedforward control circuit is for adapting the closed loop control of the controller upon the occurrence of the second AC duration.

The first AC duration is for example a burning cycle of the fluorescent lighting ballast and the second AC duration is for example an ignition cycle of the fluorescent lighting ballast. The second AC durations for example appear at a frequency in the range 100 Hz to 300 Hz, such as 200 Hz i.e. every 5 ms.

The second peak amplitude is then higher than the first peak amplitude. In a more specific case, the second AC duration does not have a constant peak amplitude during the second AC duration namely the envelope of the second AC duration is a varying signal.

The envelope signal defined by the peaks within the second AC duration is for example shaped as a gradual rise from, and fall back to, the envelope signal defined by the peaks within the first AC duration. The envelope signal for the first AC duration is essentially flat. This is the typical characteristic of an ignition signal and a burning signal from a fluorescent ballast in North America.

The length of the first AC duration is for example larger than the length of the second AC duration, the closed loop control is adapted to determine a first duty cycle of the shunt device across a plurality of the first AC durations, and said feedforward control circuit is adapted to determine a second duty cycle of the shunt device different from the first duty cycle in the second AC durations.

In this way, there is a two-level duty cycle control, with one time prior and the other time period alternating throughout the whole time. The first duty cycle is set by the slower closed loop control (e.g. 20 Hz) whereas the modification to the duty cycle is made at a higher frequency.

The feedforward control circuit is for example adapted to implement the second duty cycle within an ignition time period of the alternating current power supply from the fluorescent lighting ballast and the control loops still implements the first duty cycle within a burning time period of the alternating current power supply from the fluorescent lighting ballast.

The ignition period typically corresponds to a higher peak current delivery than the burning period. The ignition frequency is for example around 200 Hz as mentioned above, and the ignition current and burning current are for example formed an envelope signal of a higher frequency AC signal caused by the switching of the high frequency electronic ballast (e.g. at tens of kHz to a hundred kHz).

Thus, the ignition and burning time periods introduce a low frequency envelope component to the underlying high frequency electronic ballast signal. By flattening this envelope component, the requirements for a smoothing capacitor are reduced.

The driver may further comprise means for determining a type of ballast from which the alternating current power supply is received, and the feedforward control circuit is adapted to set the second duty cycle based on the determined ballast type, optionally further based on a dimming level.

This approach basically overrides the duty cycle control of the slower closed loop control. It is based on knowledge of the current during the ignition time and the burning time, which depends on the type of ballast. The determining means may be a database which is accessed based on a measurement of an amplitude and frequency of the ballast output signal. Alternatively, it may be an input for receiving a ballast type from a lighting system installer.

This is an open loop implementation wherein a preset duty cycle is provided to the shunt switch during the ignition period, and this duty cycle relates to the dimming level. For example, one ballast may have an ignition current with a peak amplitude 50% higher than the peak amplitude of burning current, and the feedforward control circuit may set a 66.6% higher duty cycle in the ignition duration with respect to the duty cycle at normal burning duration, given the same dimming level. In case the peak amplitude in ignition is varying, an average calculation of the peak amplitude can be used.

In an alternative implementation, the feedforward control circuit is for example adapted to alter a response speed of the closed loop control during the second AC duration.

This approach basically gives a quick response during ignition durations/times and restores to the slow response during burning duration/times. This has the effect of changing the duty cycle in those different time periods. If the response speed is increased, the closed loop control can act quick in responsive to the ignition current to change the duty cycle.

The feedforward control circuit may be adapted to alter the response speed of the closed loop control by setting the parameter of a proportional integral derivative controller of the closed loop control. This provides one way to alter the characteristics of a control loop.

In another alternative implementation, the feedforward control circuit may be adapted to alter a gain of an error amplifier used in the closed loop control during the second AC duration, with respect to the gain during the first AC duration. This provides another way to alter the characteristics of a control loop. In case the gain in the closed loop control is increased, the closed loop control would output a duty cycle for the ignition duration with a large difference with respect to the duty cycle for the burning duration, this duty cycle with a large difference would bring the output current to desired value more quickly in case of ignition.

The lighting driver may further comprise:
a rectifier having a rectifier input for receiving the driver input and having a rectifier output for driving the lighting load,
wherein the shunt device is either:
connected between the rectifier and the lighting load, for selectively shunting the rectifier output; or
integrated with the rectifier and for shunting the driver input.

The power supply may thus be shunted at the input or output of a rectifier. The first implementation is easy to control since the shunt switch is separate from the rectifier, while in the second implementation the shunt device can replace a diode of the rectifier and increase the efficiency of the rectifier. The complexity of the second implementation is that the shunt switch needs to be controlled to achieve both functions of rectification and shunting.

The driver may comprise a smoothing capacitor in parallel with lighting load output terminals, wherein the smoothing capacitor is a ceramic capacitor with a capacitance of less than 5 μF.

The current shaping implemented by the higher speed shunt control means that a smaller smoothing capacitor may be used. It may for example be 3.3 μf.

The control circuit may further comprise:
a dimming interface for receiving a dimming level,
and said controller is adapted to implement the closed loop control according to said dimming level.

The shunt device is thus controlled to provide a desired dimming effect using the (slower) closed loop control. The faster control is not intended for brightness control but instead relaxes the smoothing requirements.

The driver input is preferably for receiving a power supply from an electronic high frequency fluorescent lighting ballast. This defines a typical application of this aspect of the invention. The ballast has a high frequency output for example of more than 10 kHz and typically tens of kHz.

The invention also provides a lighting device such as a tubular LED lamp comprising:
a lighting driver as defined above; and
an LED lighting load, to be driven by said lighting driver.

This aspect provides a lighting device comprising the above-mentioned driver and LED. A tubular LED lamp is a typical application of this aspect of the invention.

According to another aspect of the invention, there is provided a method of controlling a lighting load, comprising:
receiving an alternating current power supply from a lighting ballast;
controlling a shunt device using closed loop control for selectively shunting the power supply thereby to implement dimming control, by operating the shunt device and not operating the shunt device;
detecting the current received from the alternating current power supply with a frequency larger than the closed loop control frequency; and
adapting the closed loop control of the controller based on the detected current.

This method has closed loop shunt control in order to control the general level of light output. Based on detection of the current received at a higher temporal resolution, the closed loop control is modified to take account of current fluctuations, such that a more constant current amplitude is delivered to the lighting load. A smoothing capacitor across the lighting load may thus be made smaller.

The method may comprise adapting the closed loop control to set a duty cycle of operation of the shunt device such that there are different duty cycles within an ignition time period of the alternating current power supply from the fluorescent lighting ballast and within a burning time period of the alternating current power supply from the fluorescent lighting ballast.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which:

FIG. 1 shows a typical block diagram of a TLED that is compatible with a fluorescent ballast;

FIG. 2 shows a shunt driver configuration in more detail including a modification in accordance with the invention;

FIG. 3 shows a known example of the detection circuit to generate the detection signal used in the driver of FIG. 2;

DETAILED DESCRIPTION OF THE EMBODIMENTS

Figure 4:
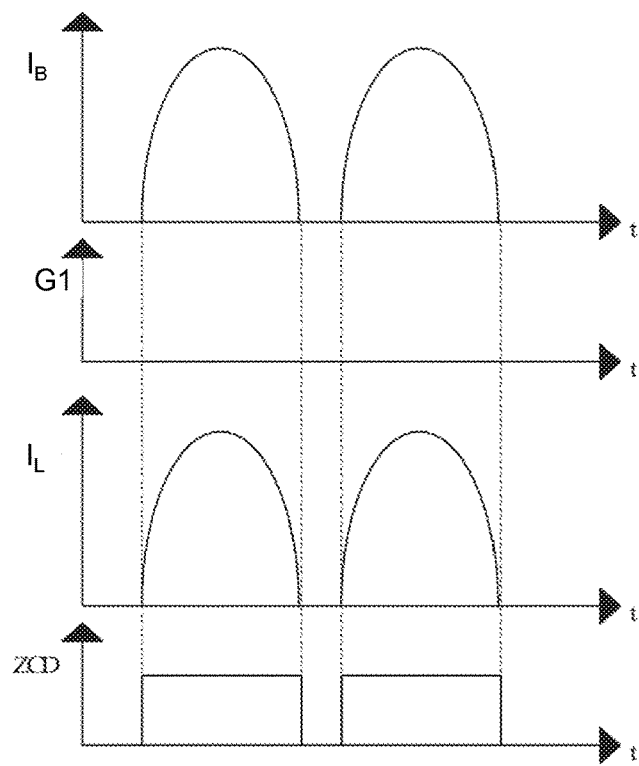
FIG. 4 shows timing diagrams to explain the known operation of the circuit of FIGS. 2 and 3 at full brightness.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting driver for receiving an alternating current power supply from a lighting ballast and makes use of a closed loop control of a shunt device for selectively shunting the power supply for example to implement dimming control. The closed loop control is adapted based a detected current. This enables low frequency components of the ballast current to be removed or reduced so that a smaller output capacitor is needed.

FIG. 2 shows a shunt driver configuration in more detail. For simplicity, only the ballast 10, rectifier 20 (formed of diode bridge diodes DB1 to DB4), output capacitor 23, LED lighting load 24 and shunt device 22a and 22b, which are essentially similar to the shunt device 22 of FIG. 1, are shown. A series capacitor 28 is provided between the ballast 10 and the rectifier 20 and this functions as a safety component.

The shunt device is implemented as two transistors 22a, 22b which together short together the rectifier input in this example, instead of the rectifier output as shown in FIG. 1. Even further, the two transistor 22a and 22b can replace some diodes when the two transistors can also be controlled as a rectifying element. Such implementation is known as a bridgeless implementation. Thus, the shunt device is either connected between the rectifier and the lighting load (FIG. 1) for selectively shunting the rectifier output, or integrated with the rectifier and for shunting the driver input (FIG. 2).

The transistors are controlled by a shunt control signal G1 which is provided by a controller circuit 30 which may be either an integrated circuit or discrete circuits. The shunt control signal G1 is a bi-state shunt control signal. The controller 30 receives a feedback signal FB from a current sense resistor 32, and also receives a dimming command 34 which is for example received wirelessly from a remote controller. It then operates the shunt device transistors 22a, 22b to prevent current reaching the LED load or else does not operate the shunt device transistors to allow the LED load to be driven, such that an energy goes to the LED load which is regulated to provide a dimming effect corresponding to the dimming command 34.

Thus, to achieve a closed loop control, resistor 32 implements a feedback loop to detect the current going to the lighting load and to control the length of the duration of operating the shunt device according to said dimming level and said detected current.

The lighting driver comprises a driver input 36 for receiving an alternating current power supply from the ballast 10.

The controller 30 operates the shunt device during a portion of the cycle of the alternating current power supply, such that a current is delivered to the LED load only during the portion of the cycle of the alternating current power supply when the shunt device is not operated.

The driver also has a detector 38 for generating a detection signal 40 and for providing the detection signal to the controller 30 to operate the shunt device. This detection signal 40 is timed with the frequency of the AC input signal and is used to implement cycle by cycle control so that the shunt device frequency tracks the ballast frequency. More specifically, the shunt switch is operated in accordance with zero crossing of the AC input (current) signal to implement soft switching.

The controller 30 also has a dimming interface for receiving the dimming level 34. The controller 30 controls a length of a duration of operating the shunt device according to said dimming level.

To the extent described above, the driver is known. The lighting driver of the invention makes use of a current sensor 90 for sensing the current received from the ballast 10 and a feedforward control circuit 92. The function and purpose of this current sensing and feedforward control is described further below. Note that the feedforward control circuit 92 will in practice be implemented in software as part of the controller 30. It is shown as some separate components for ease of explanation.

The known operation of the lighting driver will be described before the adaption in accordance with the invention.

FIG. 3 shows a known example of the detection circuit 38 to generate the detection signal 40 in the form of a zero cross detection signal ("ZCD"). The circuit comprises a resistive divider R1, R2 between one of the rectifier inputs (B1) and ground. When the load is connected to the ballast, the voltage at this point is a square wave signal, and the resistive divider generates a lower voltage version.

FIG. 4 shows timing diagrams to explain the operation of the circuit of FIGS. 2 and 3 at full brightness.

The top plot shows the current $I_B$ delivered by the ballast, the second plot shows the shunt control signal G1, the third plot shows the current $I_L$ supplied to the LED load and the bottom plot shows the detection signal ZCD.

There is no shunt control signal because there is no shunting needed. The current is supplied to the load at all times. The ZCD signal is in phase with the un-shunted input current. It has a leading edge from zero to a high value, and a trailing edge from the high value to zero. The trailing edge is at the same time as the zero crossing thus the driver knows the timing of an end of this half cycle and a start of a next half cycle.

Figure 5:
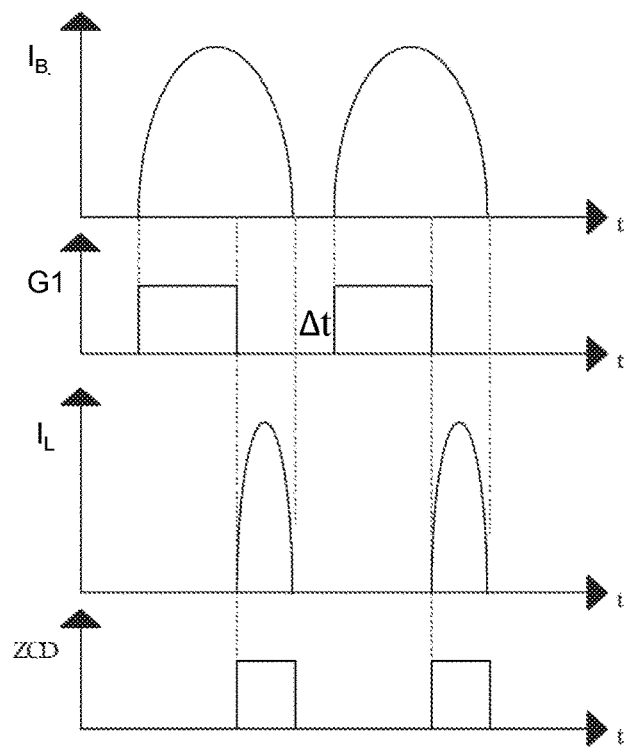
FIG. 5 shows timing diagrams to explain the known operation of the circuit of FIGS. 2 and 3 at a dimmed brightness level.

FIG. 5 shows timing diagrams to explain the operation of the circuit of FIGS. 2 and 3 at a dimmed brightness level.

Again, the top plot shows the current $I_B$ delivered by the ballast, the second plot shows the shunt control signal G1, the third plot shows the current $I_L$ supplied to the LED load and the bottom plot shows the detection signal ZCD.

The shunt control signal causes part of the current waveform not to pass to the load. The detection signal is hence shorter, since it only arises when there is a load current and hence voltage. Triggered by the trailing edge of the detection signal ZCD, the driver knows an end of this half cycle and a start of a next half cycle, and the shunt device will be operated again almost immediately, though the drawing shows a small time offset Δt between them.

The ballast current passes through the shunt device during shunt switching.

Figure 6:
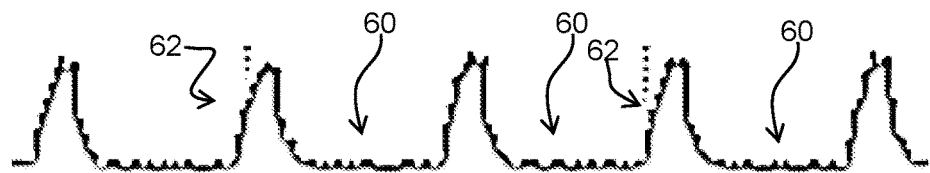
FIG. 6 shows an example of a ballast output current waveform.
Figure 6:

FIG. 6 shows an example of a ballast output current waveform. The waveform oscillates at the switching frequency of the high frequency electronic ballast such as tens of kHz to a hundred kHz. FIG. 6 does not show the high frequency switching but shows only the envelope signal. It comprises flat regions 60 and peak/pulse regions 62. The peak/pulse regions 62 are ignition durations/times and the flat regions 60 are burning durations/times.

The flat regions 60 will be termed a first AC duration for the following discussion, and the high frequency peaks during that first AC duration (which form the envelope signal shown) have a first peak amplitude which is substantially constant. The peak regions 62 each will be termed a second AC duration for the following discussion, and the high frequency peaks during that second AC duration (which form the envelope signal shown) have a second peak amplitude. The first AC duration and the second AC duration appear alternatively. The second AC durations 62 for example appear at a frequency in the range 100 Hz to 300 Hz, such as 200 Hz i.e. every 5 ms.

The second peak amplitude (i.e. the maximum height of the envelope signal during the second AC duration) is then higher than the first peak amplitude (i.e. the maximum height of the envelope signal during the first AC duration). The second peak amplitude is variable within the second AC duration 62 as shown. It rises from, and falls back to, the envelope signal/peak amplitude defined in the first AC duration. This is the typical characteristic of an ignition signal from a North American fluorescent ballast.

Figure 7:
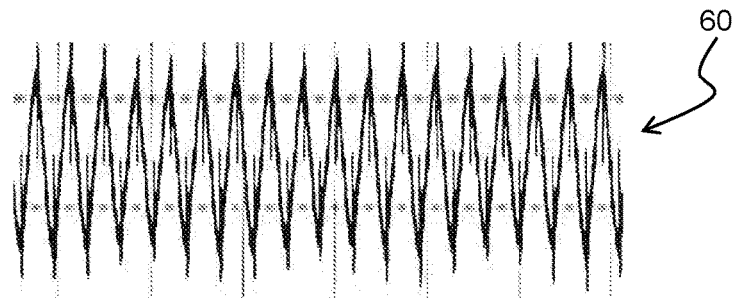
FIG. 7 shows one portion of one of the first AC durations to show the underlying high frequency signal.

FIG. 7 shows one portion of one of the first AC durations 60 to show the underlying high frequency signal.

For the known driver without the improvement of the present innovation, the duty cycle of the shunt switch is constant throughout the first and the second AC duration, from a macro view point. During the ignition time defined by the second AC durations 62, more current goes to the capacitor 23 and the capacitor 23 is charged; whereas during the burning time defined by the first AC durations 60, less current goes to the capacitor 23 and the capacitor 23 is discharged. Because the ignition time is around 200 Hz, the size of the capacitor needs to be high. Typically a 68 µf capacitor is used in known circuits. This is a large size component, and it therefore enlarges the size of driver. The capacitor may also reduce the lifetime of the driver as it may have a limited lifetime of less than 25000 hours.

The invention makes use of the shunt switch functionality to cut off the peak area and hence create a more flat output current.

Figure 8:
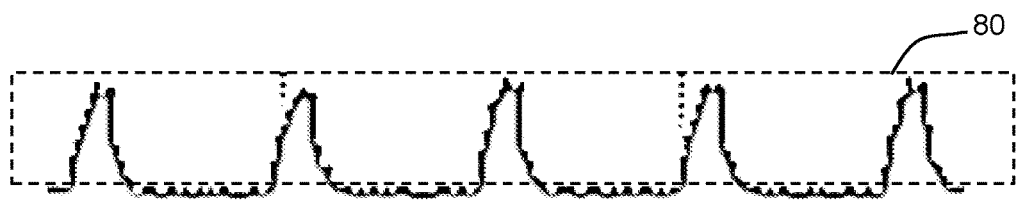
FIG. 8 shows schematically the intended function of the shunt switch.
Figure 8:
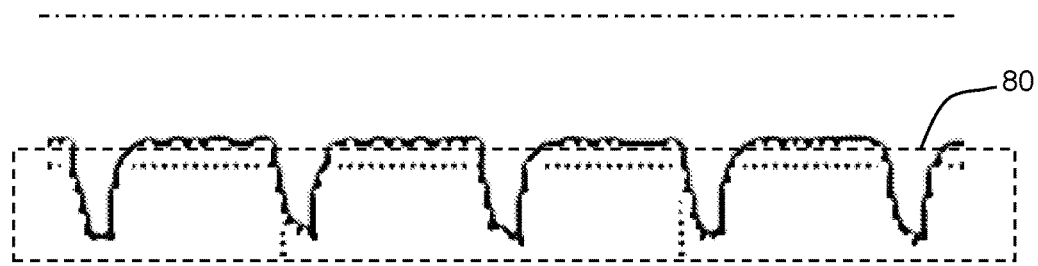

FIG. 8 shows schematically the intended additional function of the shunt switch control. The regions 80 are to be chopped by the shunt switch by varying the originally constant duty cycle of the shunt switch. In this way, the low frequency output current component is removed and only high frequency output current components remain. In this way, the capacitor 23 may be replaced with a small ceramic capacitor, for example with capacitance below 5 µF, for example 3.3 µf. This represents a size reduction of 98%.

In order to enable this size reduction, the invention uses the detector 90 for detecting the current received from the alternating current power supply and the feedforward control circuit 92 for adapting the closed loop control of the controller based on the detected current. These components are shown in FIG. 2.

The first AC duration 60 is typically longer than the second AC duration 62. In operation of the known closed loop control approach, a duty cycle of the shunt device is determined which is then applied for a plurality of the first AC durations 60 and the second AC duration 62. The duty cycle for the first AC durations may be considered to be a first duty cycle.

In accordance with the invention, the feedforward control circuit 92 is adapted to determine a second duty cycle of the shunt device different from the first duty cycle to be applied during the second AC durations 62.

The duty cycle with which shunting takes place is increased to provide the chopping function shown in FIG. 8.

Figure 9:
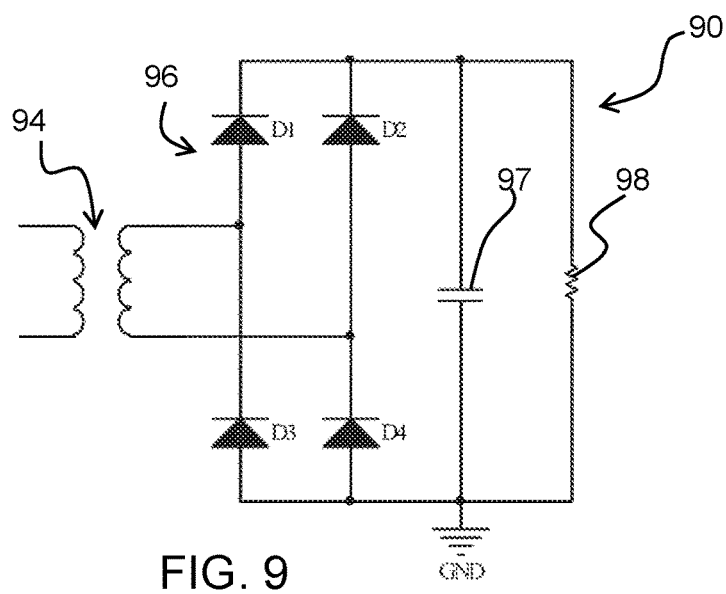
FIG. 9 shows an example of the current detector.

FIG. 9 shows an example of the current detector 90. It comprises a transformer 94 with two coils. The primary side coil is in series with the series input capacitor 28 and the secondary side coil connects to a full-bridge rectifier 96 and a parallel capacitor 97 and resistor 98. This circuit can transform the current signal to a voltage signal. The transformer 94 is for example a current transformer to detect the ballast output current.

By way of example, the average current though the primary side coil may be of the order of 150 mA. A 50:1 turns ratio gives a 3 mA average current through secondary coil. The current waveform is the same shape as the primary side, but with the amplitude decreased accordingly.

$$I_{primary} = I_{secondary}/N.\text{ where } N \text{ is the turn ratio.}$$

The current through the secondary coil then passes through the full bridge rectifier to result in a DC current. By way of example, capacitor 97 has capacitance 1 µF and resistor 98 has resistance 1 kΩ, The current through the resistor and capacitor results in a voltage signal of:

$$3\text{ mA} \times 1\text{ k}\Omega = 3\text{V}.$$

The capacitor 97 is small to filter only high frequency signals. For example, the frequency over 1 kHz is suppressed, because the ignition frequency (which is to be detected) is lower than 500 Hz.

When power is initially turned on, the shunt switch is not operated. The capacitor 23 first has to be charged. The current detection circuit is also initialized. The current detection circuit is for example connected to a microcontroller A/D port. Sampling of the current (by measuring the voltage across the resistor 98) for example takes place every 20 µs. By sampling and averaging 2000 values of the voltage, an average of the voltage is obtained over a 40 ms period. This includes at least one cycle of ignition periods so that an overall average current is obtained. This will be the 3V level.

A first detection threshold may then be set, such as 10% higher (i.e. 3.3V) and a second detection threshold may be set, such as 10% lower (i.e. 2.7V).

Each sampled voltage is compared with the two detection thresholds. When the voltage has 3 successive values over the first threshold, this is used as an indication that the ignition time has started.

When the voltage has 3 successive values lower than the second threshold, this is used as an indication that the ignition time has passed and burning time has started.

The ignition time happens at 200 Hz.

The ignition cycle is repeated so that lamps can be replaced and then an auto-burn function is implemented.

When the ignition signal is detected, the shunt switch duty cycle is modified. There are various ways to implement the shunt switch control mechanism.

Figure 10:
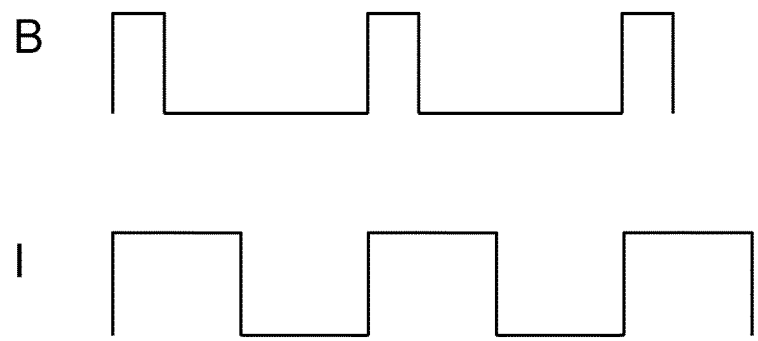
FIG. 10 shows a first approach for adapting the shunt switch control.

FIG. 10 shows a first approach. The controller providing a larger duty cycle during ignition (I, bottom plot) than that during burning (B, top plot). The change in duty cycle may be determined based on the ballast type and prestored in the controller. The ballast type may be recognized for example from the characteristic switching frequency and amplitude of the output, or other characteristics of the ballast output. A database may be used which is pre-stored within the driver, which maps between the amplitude and frequency of the ballast's AC output and the corresponding ballast model. The ballast output characteristics may be obtained by testing by the driver manufacturer.

A suitable duty cycle adjustment for the ignition times for this ballast model can also be pre-stored.

For example, one particular ballast may have output characteristics such as an output current capability of 165 mA during burning time. If the required output current is 110 mA, a 80% dimming level is set of the burning time corresponding to a duty cycle of 20%, shown as the top plot of FIG. 10.

The output current is for example average 200 mA during ignition time. When the ignition time is detected, the duty cycle is increased to for example 50% as shown in the bottom plot of FIG. 10. When the ignition time is over, the duty cycle is returned to 20%. The chosen duty cycle of 50% is determined based on testing of that particular ballast type. For different dimming level, the percentage of increasing the duty cycle may be different.

This approach enables open loop control, namely the control at the ignition phase is based on a fixed/predefined duty cycle without sensing the real ignition current output from the ballast.

In a more intelligent/adaptive embodiment, the duty cycle at the ignition phase is not fixed, but is determined in a close loop feedback manner.

One implementation is configuring a dedicated fast response feedback circuit, with a response frequency matching the frequency of the ignition current. For example, the response frequency is 5 kHz. If the ballast output frequency is 30 kHz, after 6 cycles of ignition current, the feedback circuit tunes the duty cycle to reduce the output current.

In another more economical implementation, the existing closed control loop is controlled with a faster response speed to enable the duty cycle to be controlled in real time according to the detected output current and desired current.

The slower control loop is maintained/restored during burning times, since this translates to increased control loop stability.

Figure 11:
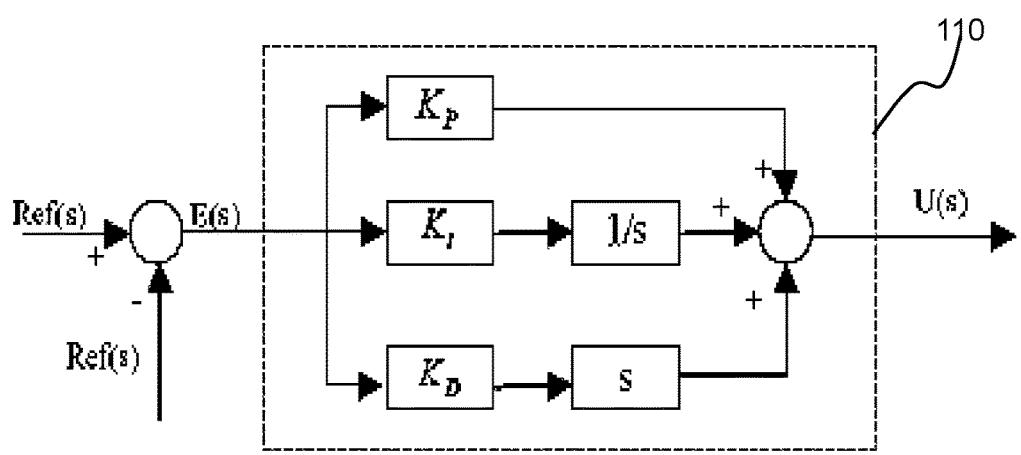
FIG. 11 shows a PID controller to enable closed loop control.

FIG. 11 shows a PID controller 110 to enable closed loop control. FIG. 11 shows the Kp, Ki and Kd control parameters of the PID control. The control is based on a function:

$$\Delta U(t)=Kp^*(e(t)-e(t-1))+Ki^*e(t)+Kd^*(e(t)-2^*e(t-1)+e(t-2))$$

e(t) is the input signal to the PID controller, based on the difference between a reference and the output current. The calculation result u(t) provides the increment of the duty cycle.

For a quicker response, Kp can be increased and Ki and Kd can be reduced. This means the duty cycle of the shunt switch will change quickly. The opposite measures will make the duty cycle of the shunt switch change more slowly.

Thus, by selecting different PID parameters to tune the duty cycle, when the burning time is approaching a slow response set of PID parameters is used and when the ignition time is approaching a fast response set of PID parameters is used.

Normally, the corner frequency of the driver for lighting applications is below 50 Hz, and it may be around 20 Hz for example, so the response time is long. In particular, the closed loop response time is then 50 ms. This low corner frequency is used to obtain a high phase margin (such as over 45 degrees) and this in turn translates to closed loop stability.

Figure 12:
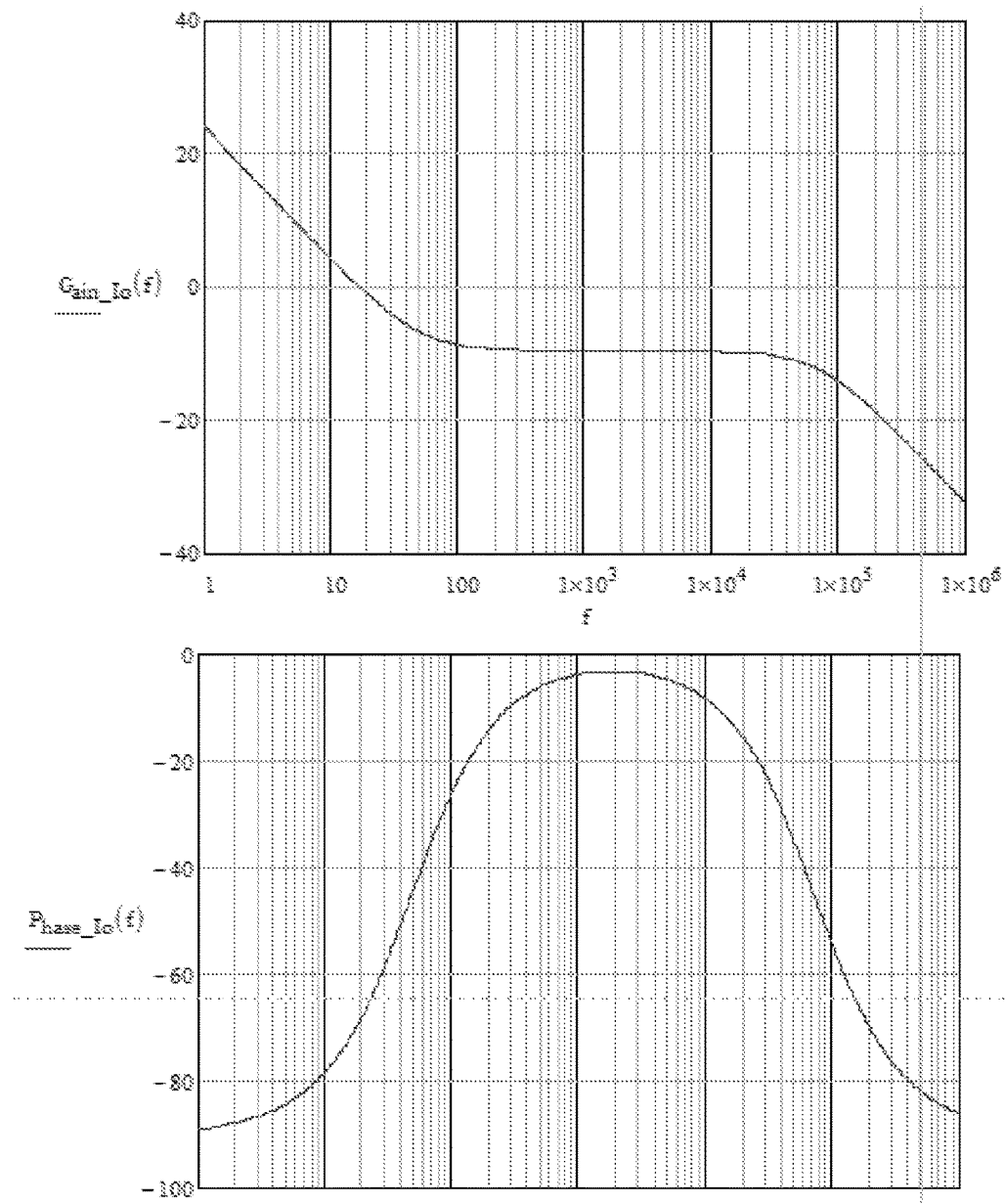
FIG. 12 shows a typical PID control diagram.

FIG. 12 shows the typical PID control diagram. The top pane is the gain response as a function of frequency and the bottom pane is the phase response as a function of frequency.

The ignition frequency of the ballast is from 100 Hz to 300 Hz, so a suitable set of values Kp, Ki, Kd is chosen to give a fast response in this frequency range, for example to move the corner frequency to 1 kHz. This can be implemented digitally, by changing the digital filter characteristics.

Figure 13:
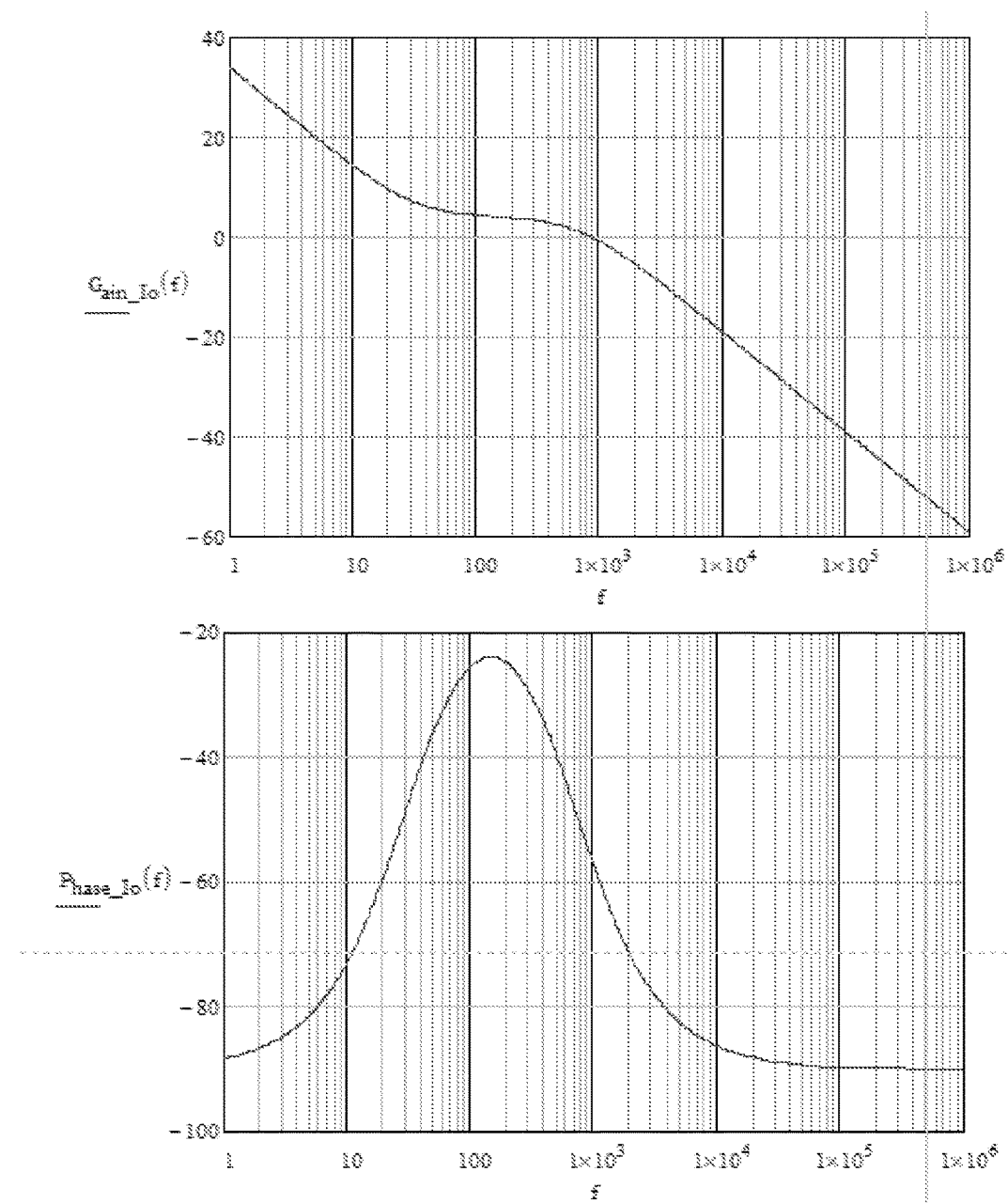
FIG. 13 shows an adapted PID control diagram.

FIG. 13 shows the adapted PID control diagram. The top pane is again the gain response as a function of frequency and the bottom pane is the phase response as a function of frequency.

By providing a fast response for ignition and a slow response for burning, the output current peaks are chopped and the large capacitor can be eliminated, also increasing the lifetime of the driver.

Figure 14:
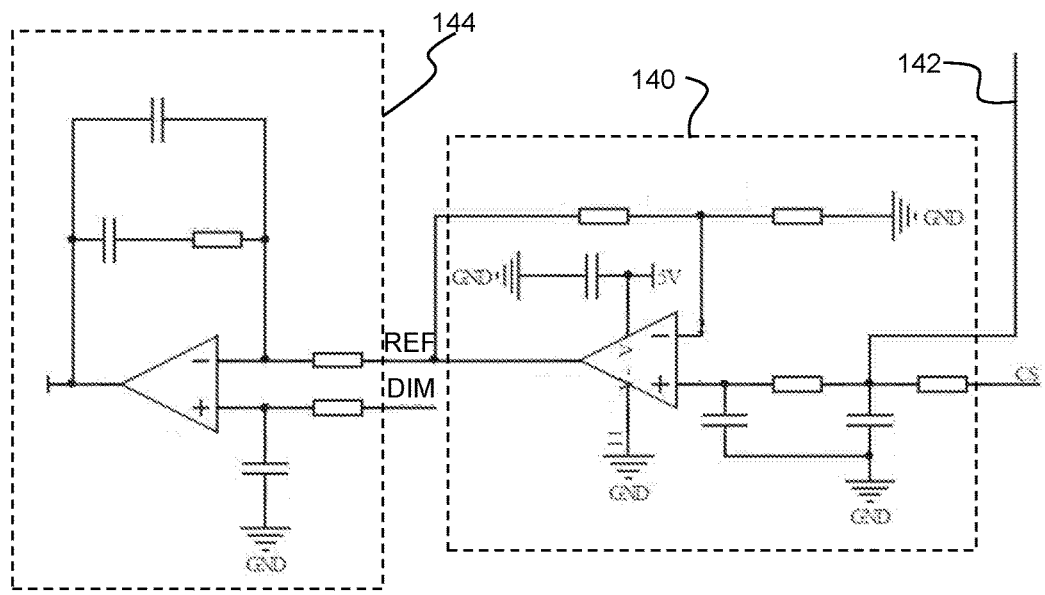
FIG. 14 shows an error amplifier having a gain which depends on the detection of the ignition pulses.

Another approach is explained briefly with reference to FIG. 14 which shows an error amplifier 140 which receives the sensed current as input 142. The gain of this error amplifier depends on an input signal CS which depends on the detection of the ignition pulses. The output "REF" of the error amplifier 140 supplies an output stage 144 which also receives as input the dimming control signal DIM.

In this arrangement, the control loop is switched into non-linear operation upon the detection of ignition. More specifically, the gain of the error amplifier 140 in the control loop can increase significantly, such that the difference in the detected output current and the desired output current will be amplified significantly. This large error will generate a larger variance in the duty cycle to counteract the slow response of the control loop and cause the control loop to act to reduce the output current more quickly. By controlling the gain of an error amplifier, a static error is eliminated.

Figure 15:
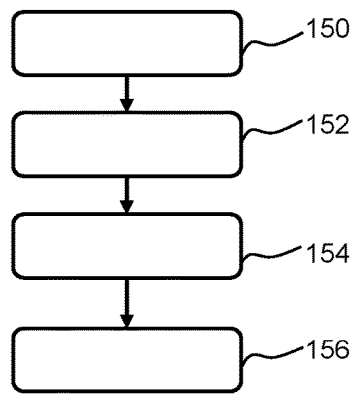
FIG. 15 shows a method of controlling a lighting load.

FIG. 15 shows a method of controlling a lighting load, comprising:
  in step 150, receiving an alternating current power supply from a fluorescent lighting ballast;
  in step 152, controlling a shunt device using closed loop control for selectively shunting the power supply thereby to implement dimming control, by operating the shunt device and not operating the shunt device;
  in step 154, detecting the current received from the alternating current power supply with a frequency larger than the closed loop control frequency; and
  in step 156, adapting the closed loop control of the controller based on the detected current.

One circuit example has been presented above for the shunt control. However, it will be understood that the same circuit functionality may be achieved with other circuit designs. A number of options for changing the control loop characteristics to enable suppression of an ignition pulse have been described above, but other equivalent approaches will be apparent to those skilled in the art.

As discussed above, embodiments make use of a controller 30. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

The invention is of interest for retrofit LED lighting for application to existing fluorescent ballasts, in particular high frequency electronic ballasts. It is of particular interest for drivers with wireless dimming control (and optionally soft shut down functionality), and for tubular LED lighting.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting driver, comprising:
a driver input for receiving an alternating current power supply from a lighting ballast;
a shunt device for selectively shunting the power supply;
a controller operating closed loop control for operating or not operating the shunt device, wherein the controller is adapted to operate the shunt device during a portion of the cycle of the alternating current power supply, such that a current is delivered to a lighting load only during the portion of the cycle of the alternating current power supply when the shunt device is not operated;
a detector for detecting the current received from the alternating current power supply with a frequency larger than the closed loop control frequency; and
a feedforward control circuit for adapting the closed loop control of the controller based on the detected current.

2. A lighting driver as claimed in claim 1, wherein the lighting ballast is a fluorescent lamp ballast or a HID lamp ballast, and wherein said alternating current power supply has a first AC duration comprising signal alternations with a first peak amplitude and a second AC duration comprising alternations with a second peak amplitude, wherein said first AC duration and said second AC duration appear alternatively, and
said detector is for detecting the occurrence of the second AC duration and said feedforward control circuit is for adapting the closed loop control of the controller upon the occurrence of the second AC duration.

3. A lighting driver as claimed in claim 2, wherein said second peak amplitude is higher than the first peak amplitude.

4. A lighting driver as claimed in claim 3, wherein the length of the first AC duration is larger than the length of the second AC duration, the closed loop control is adapted to determine a first duty cycle of the shunt device across a plurality of the first AC durations, and said feedforward control circuit is adapted to determine a second duty cycle of the shunt device different from the first duty cycle in the second AC durations.

5. A lighting driver as claimed in claim 4, wherein the feedforward control circuit is adapted to implement the second duty cycle within an ignition time period of the alternating current power supply from the fluorescent lighting ballast and implement the first duty cycle within a burning time period of the alternating current power supply from the fluorescent lighting ballast.

6. A lighting driver as claimed in claim 4, further comprising means for determining a type of ballast from which the alternating current power supply is received, and the feedforward control circuit is adapted to set the second duty cycle based on the determined ballast type, optionally further based on a dimming level.

7. A lighting driver as claimed in claim 4, wherein the feedforward control circuit is adapted to alter a response speed of the closed loop control during the second AC duration.

8. A lighting driver as claimed in claim 7, wherein the feedforward control circuit is adapted to alter the response speed of the closed loop control by setting the parameter of a proportional integral derivative controller of the closed loop control.

9. A lighting driver as claimed in claim 4, wherein the feedforward control circuit is adapted to alter a gain of an error amplifier used in the closed loop control during the second AC duration, with respect to the gain during the first AC duration.

10. A lighting driver as claimed in claim 1, further comprising:
a rectifier having a rectifier input for receiving the driver input and having a rectifier output for driving the lighting load,
wherein the shunt device is either:
connected between the rectifier and the lighting load, for selectively shunting the rectifier output; or
integrated with the rectifier and for shunting the driver input.

11. A lighting driver as claimed in claim 1, comprising a smoothing capacitor in parallel with lighting load output terminals, wherein the smoothing capacitor is a ceramic capacitor with a capacitance of less than 5 µF.

12. A lighting driver as claimed in claim 1, wherein the control circuit further comprises:
a dimming interface for receiving a dimming level,
and said controller is adapted to implement the closed loop control according to said dimming level.

13. A lighting device comprising:
a lighting driver as claimed in claim 1; and
an LED lighting load, such as a tubular LED lamp, to be driven by said lighting driver.

14. A method of controlling a lighting load, comprising:
receiving an alternating current power supply from a lighting ballast;
controlling a shunt device using closed loop control for selectively shunting the power supply thereby to implement dimming control, by operating the shunt device and not operating the shunt device;

detecting the current received from the alternating current power supply with a frequency larger than the closed loop control frequency; and adapting the closed loop control of the controller based on the detected current.

15. A method as claimed in claim 14, comprising adapting the closed loop control to set a duty cycle of operation of the shunt device such that there are different duty cycles within within an ignition time period of the alternating current power supply from the fluorescent lighting ballast and within a burning time period of the alternating current power supply from the fluorescent lighting ballast.

* * * * *